United States Patent Office 3,322,631
Patented May 30, 1967

3,322,631
METHOD OF TREATMENT OF HYPERTENSION
James M. Sprague, Gwynedd Valley, Frederick C. Novello, Berwyn, and Albert A. Deana, Lansdale, Pa., assignors to Merck & Co., Inc., Rahway, N.J., a corporation of New Jersey
No Drawing. Filed June 30, 1965, Ser. No. 468,632
7 Claims. (Cl. 167—65)

This invention relates to a method for the reduction of mammalian blood pressure. More specifically, this invention relates to a method of reducing mammalian blood pressure which comprises administering to a mammal 50–500 mg. three to four times a day a compound of the structure:

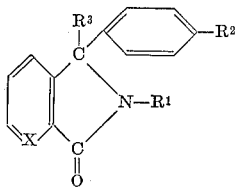

in which
X is one of the group consisting of —CH= or —N=;
$R^1$ is one of the group consisting of hydrogen, lower alkyl or di (lower alkyl) amino lower alkyl;
$R^2$ is one of the group consisting of halogen, di (lower alkyl) amino or $CF_3$;
$R^3$ is one of the group consisting of hydrogen, anilino, piperidino, pyrrolidino, benzylamino, morpholino, hydroxy, lower alkoxy, phenoxy, benzyloxy or halogeno lower alkoxy;
together with a pharmaceutically acceptable carrier.

The study of hypertension or high blood pressure is becoming increasingly important in medical research. There is a need for compounds which are usable to reduce blood pressure in mammals, both as a research tool in lower animals and possibly eventually in human therapy.

We have found that there is a surprisingly effective lowering of mammalian blood pressure by the administration either orally or intravenously of compounds of the structure:

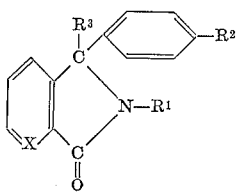

in which
X is one of the group consisting of —CH= or —N=;
$R^1$ is one of the group consisting of hydrogen, lower alkyl or di(lower alkyl)amino lower alkyl;
$R^2$ is one of the group consisting of halogen, di(lower alkyl)amino or $CF_3$;
$R^3$ is one of the group consisting of hydrogen, anilino, piperidino, pyrrolidino, benzylamino, morpholino, hydroxy, lower alkoxy, phenoxy, benzyloxy or halogeno lower alkoxy;
together with a pharmaceutically acceptable carrier.

The dose of some of these compounds is of the same order of magnitude in test animals as is needed for many anti-hypertensive drugs now used on humans. These compounds, however, have different side effects on other mammalian functions such as the renal function and the blood chemistry. Thus, these compounds provide a tool for biochemical research extremely useful in the study of high blood pressure.

In the method of our invention the anti-hypertensive compounds may be used with any pharmaceutically acceptable carrier. They can be used with any inert material normally used in compounding medicaments. They can be used in capsules. When used intravenously the carrier can be a solvent such as an isotonic solution or a suspension.

Some of the compounds within the scope of this invention are known while others are not. Their anti-hypertensive properties have not heretofore been known. The unknown compounds are prepared generally by methods shown in the art for the known ones. Thus, the compound of Example 1 is prepared by the method of German Patent No. 1,135,461. Similarly, the compound of Formula I

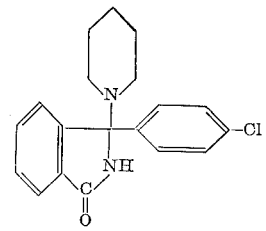

is prepared by the method of Helv. Chim. Acta, 42 1085 (1959) by the use of piperidine. Similarly, the morpholino, pyrrolidino, anilino or benzylamino compound is obtained. The same Swiss reference describes the preparation of the corresponding 3-methoxy compound; by using different alcohols one obtains the corresponding ethoxy, and trifluoroethoxy compounds instead of the methoxy compound.

The compound of Formula II

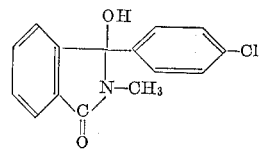

is prepared also by a process disclosed in the same Swiss reference while the corresponding 2-diethylaminoethyl compound which is described in Example 5 is prepared by a process shown in German Patent 1,113,461.

This invention can be illustrated by the following examples:

Example 1

3-(p-chlorophenyl)-1-oxoisoindoline

A solution of 12.0 g. (0.17 mole) of hydroxylamine hydrochloride in 40 ml. water is added dropwise over 10 minutes to a solution of 19.55 g. (0.075 mole) of 2-(p-chlorobenzoyl) benzoic acid in 200 ml. of water containing 42.0 g. (0.075 mole) of potassium hydroxide. The mixture is heated under reflux for 30 minutes, kept at room temperature for 16 hours, cooled in an ice bath and acidified with concentrated hydrochloric acid. The precipitate is collected and recrystallized from ethanol to give 2 - (p-chlorobenzoyl) benzoic acid anhydroxime, M.P. 187–190°.

Analysis.—Calcd. for $C_{14}H_8ClNO_2$: C, 65.26; H, 3.13; N, 5.44. Found: C, 65.53; H, 3.54; N, 5.40.

A stirred solution of the anhydroxime (10.3 g.) in 250 ml. of acetic acid is treated with zinc dust (13.2 g.) portionwise over 20 minutes, at 85–90°. The mixture is heated on the steam bath for 10 minutes, stirred an additional hour at room temperature and poured into 500 ml. of cold water. The solid is collected, washed with water and recrystallized from ethanol-water to give title compound, M.P. 213–215°.

*Analysis.*—Calcd. for $C_{14}H_{10}ClNO$: C, 69.00; H, 4.14; N, 5.75; Cl, 14.55. Found: C, 68.92; H, 4.24; N, 5.70; Cl, 14.55.

EXAMPLE 2

3-(p-chlorophenyl)-3-morpholino-1-oxoisoindoline

A solution of 3-chloro-3-(p-chlorophenyl)-1-oxoisoindoline, prepared from 2.6 g. of 3-(p-chlorophenyl)-3-hydroxy-1-oxoisoindoline and 10 ml. of thionyl chloride, in 10 ml. of chloroform is cooled in an ice bath and treated with 5 ml. of morpholine dropwise over 5 minutes. The mixture is stirred at room temperature for 1 hour and concentrated to dryness in vacuo. The residue is treated with water and extracted with ether. The ether extract is washed with water, dried over sodium sulfate, filtered and concentrated to dryness and the residue recrystallized from ethanol to give title compound, M.P. 224–227°.

*Analysis.*—Calcd. for $C_{18}H_{17}ClN_2O_2$: C, 65.75; H, 5.21; N, 8.52. Found: C, 65.37; H, 5.23; N, 8.50.

EXAMPLE 3

3-(p-chlorophenyl)-1-oxo-3-(2',2',2'-trifluoroethoxy) isoindoline

A solution of 3-chloro-3-(p-chlorophenyl)-1-oxoisoindoline, prepared from 2.6 g. of 3-(p-chlorophenyl)-3-hydroxy-1-oxoisoindoline and 10 ml. of thionyl chloride, in 7.5 ml. of 2,2,2-trifluoroethanol is treated with 2 ml. of pyridine, allowed to stand at room temperature for 48 hours and concentrated to dryness in vacuo. The residue is taken up in ether, washed with water and dried over sodium sulfate. After filtration the ether solution is concentrated and the product recrystallized from ether-hexane to give the title compound, M.P. 126–129°.

*Analysis.*—Calcd. for $C_{16}H_{11}ClF_3NO_2$: C, 56.24; H, 3.24; N, 4.10. Found: C, 56.26; H, 3.16; N, 4.22.

EXAMPLE 4

3-(p-chlorophenyl)-3-ethoxy-1-oxoisoindoline

A solution of 1.0 g. of 3-(p-chlorophenyl)-3-hydroxy-1-oxoisoindoline in 15 ml. of ethanol and 15 mg. of p-toluenesulfonic acid is heated under reflux for 5 minutes and concentrated to dryness in vacuo. The residue is recrystallized from ethanol-water to give the title compound, M.P. 140–143°.

*Analysis.*—Calcd. for $C_{16}H_{14}ClNO_2$: C, 66.79; H, 4.90; N, 4.87. Found: C, 65.82; H, 4.89; N, 4.87.

EXAMPLE 5

2-(β-diethylaminoethyl)-3-(p-chlorophenyl)-3-hydroxy-1-oxoisoindoline

A suspension of 7.8 g. of 2-(p-chlorobenzoyl)-benzoic acid in 25 ml. of thionyl chloride is treated with 0.2 ml. of dimethylformamide and the resulting solution stirred at 35–40° for 5 hours and concentrated to dryness in vacuo. Traces of thionyl chloride are removed by consecutive washing with two 25 ml. portions of benzene and concentrating to dryness in vacuo. The residue is taken up in 250 ml. of ether and treated with 7.0 g. of β-diethylaminoethyl amine added portionwise. The mixture is stirred at room temperature for 48 hours and poured into cold dilute aqueous hydrochloric acid. The acid fraction is washed with ether and made alkaline with aqueous sodium hydroxide. The resulting oil is taken up in ether, dried over potassium carbonate, filtered, concentrated to 50 ml., and treated with 5 ml. of ethanolic hydrochloric acid. The precipitate is recrystallized from ethanol-ether to give the hydrochloride of title compound, M.P. 176–179°.

*Analysis.*—Calcd. for $C_{20}H_{24}Cl_2N_2O_2$: C, 60.76; H, 6.12; N, 7.09; Cl, 17.94. Found: C, 60.25; H, 6.19; N, 6.94; Cl. 17.54.

EXAMPLE 6

Various compounds are tested for their effects on unanesthetized renal hypertensive rats when administered in the manner indicated. Blood pressure was automatically recorded directly, using a pressure transducer, from an indwelling polyethylene catheter lying in the aorta. The systolic, diastolic and mean blood pressures and heart rates were recorded on a medical electronic polygraph. At least two fresh animals were used for each dose, each animal acting as its own control by securing the untreated pressure before administration. In addition placebo tests were run on other animals to check normal variation of pressure during the test periods. A drug was considered active if a lowering of 10 mm. or more was observed. The compounds used had the general formula

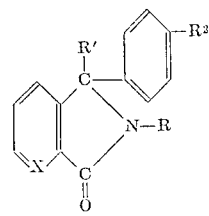

The definitions of the R's and X being given in the table below, together with the method of administration. All significantly reduced blood pressure at the doses indicated.

| X | R | R¹ | R² | Method of Admin. | Dose (mg./kg.) |
|---|---|---|---|---|---|
| —CH= | H | OH | Cl | IP | 20<br>40<br>100 |
| —CH= | H | OH | CF₃ | PO | 40 |
| —CH= | CH₃ | OH | Cl | IP | 40 |
| —CH= | H | OH | H | IP | 40 |
| —CH= | H | H | Cl | IP | 100 |
| —CH= | —CH₂CH₂—N(C₂H₅)₂ | OH | Cl | IP | 17.2 |
| —N= | H | OH | Cl | IP | 50 |
| —CH= | H | —N⟨  ⟩O | Cl | IP | 100 |
| —CH= | H | —O—CH₂CF₃ | Cl | IP | 100 |
| —CH= | H | —NH—⟨  ⟩ | Cl | IP | 100 |

We claim:
1. A method of reducing mammalian blood pressure which comprises administration to a mammal of 50 to 500 mg. three to four times a day of a compound of the structure

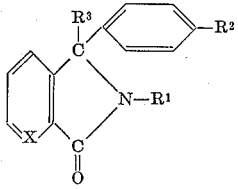

in which

X is one of the group consisting of —CH= or —N=;
R¹ is one of the group consisting of hydrogen, lower alkyl or di(lower alkyl) amino lower alkyl;
R² is one of the group consisting of halogen, di(lower alkyl) amino or CF₃; and
R³ is one of the group consisting of hydrogen, anilino, piperidino, pyrrolidino, benzylamino, morpholino, hydroxy, lower alkoxy, phenoxy, benzyloxy, or halogeno lower alkoxy;

together with a pharmaceutically acceptable carrier.

2. The method of claim 1 in which the administration is intraparenteral.
3. The method of claim 1 in which the administration is oral.
4. The method of claim 2 in which the compound has the structure

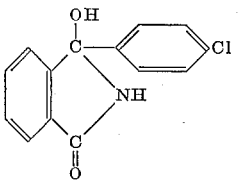

5. The method of claim 3 in which the compound has the structure

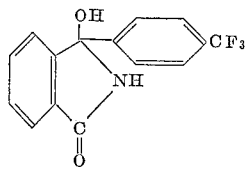

6. The method of claim 2 in which the compound is

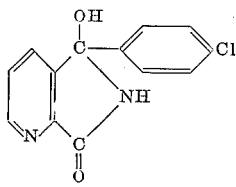

7. The method of claim 2 in which the compound is

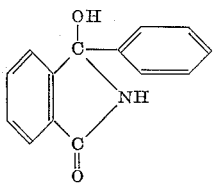

No references cited.

ALBERT T. MEYERS, *Primary Examiner.*
LEROY B. RANDALL, *Assistant Examiner.*